Figure 1:
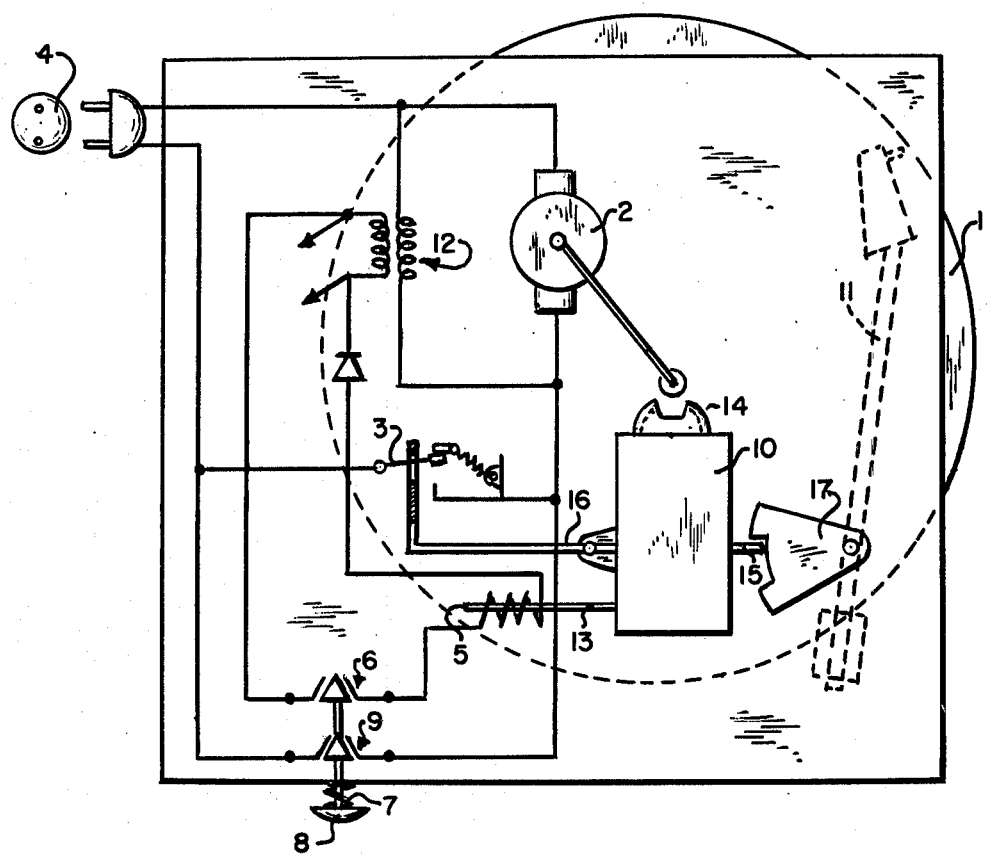

United States Patent [19]
Lehmann

[11] 4,320,494
[45] Mar. 16, 1982

[54] SWITCH DEVICE FOR A TURNTABLE

[75] Inventor: Rüdiger Lehmann, St. Georgen, Fed. Rep. of Germany

[73] Assignee: Dual Gebrüder Steidinger GmbH & Co., St. Georgen, Fed. Rep. of Germany

[21] Appl. No.: 19,730

[22] Filed: Mar. 12, 1979

[30] Foreign Application Priority Data

Mar. 14, 1978 [DE] Fed. Rep. of Germany ....... 2810963

[51] Int. Cl.³ .......................................... G11B 17/02
[52] U.S. Cl. ................... 369/225; 369/192; 369/243
[58] Field of Search ............... 369/196, 243, 226, 266, 369/225

[56] References Cited

U.S. PATENT DOCUMENTS

| | | | |
|---|---|---|---|
| 3,010,725 | 11/1961 | Fleming et al. | 369/243 |
| 3,163,428 | 12/1964 | Laufer | 369/243 |
| 3,534,967 | 10/1970 | Freier | 369/196 |
| 3,848,875 | 11/1974 | Miyoshi | 369/203 |
| 4,143,879 | 3/1979 | Wren | 369/243 |
| 4,195,845 | 4/1980 | Inaba | 369/243 |

Primary Examiner—Steven L. Stephan
Attorney, Agent, or Firm—Martin A. Farber

[57] ABSTRACT

A switch device for a turntable with a starting device which closes the switch for the drive motor on the one hand by means of a swinging movement of the pick-up arm manually during swinging-in from its support bracket onto the record, and on the other hand by means of a direct current dc low voltage solenoid which is actuated by momentary actuation of an operating service element, the latter being connected with a first contact pair, and a switch-off device which acts automatically with the arriving of the pick-up or reproducing head in the run-out groove of the record, the switch-off device opening the switch for the drive motor and containing a switch for the entire current supply of the device from the power supply mains. In a per se known manner a common main switch lies in the circuit for the drive motor and the other current supply of the device, and a second contact pair is connected with the operating element for starting the device such that it opens and closes in the same direction with said first contact pair for the solenoid and is connected parallel to the main switch.

2 Claims, 2 Drawing Figures

SWITCH DEVICE FOR A TURNTABLE

The invention relates to a switch device for a turntable with a starting device which closes the switch for the drive motor on the one hand by means of a swinging movement of the pick-up arm manually during swinging-in from its support rest onto the record, and on the other hand by means of a direct current (dc) low voltage solenoid which is actuated by momentary actuation of an operating service element, the latter being connected with a contact pair, and a switch-off device which acts automatically with the arriving of the pick-up or reproducing head in the run-out groove of the record, the switch-off device opening the switch for the drive motor and containing a switch for the entire current supply of the device from the power supply mains.

For operating of turntables it is frequently desired to have very easy operating service elements, since the turntable or record players are elastically mounted and are sensitive to vibration. Consequently push-buttons with electrical contacts have been well-proven, whereby the control device of the turntable is constructed so that a momentary touching of a button is sufficient to release or give rise to the desired switching operation. Because of the button's moveable connection to the device, the button can be mounted on a non-elastically mounted part of the device. The use of such type of buttons brings about the use of solenoids for actuation of the control devices. These solenoids then can only be produced economically if they are driven with low voltage, preferably with direct (dc) voltage. The same is true for servomotors which are used instead of solenoids. The conventional turntable automatically turns off by means of the pick-up after the playing of a record, or respectively, after the last of a stack, and indeed for reasons of suitability, not only is the drive of the turntable turned-off, but also the entire device is electrically turned-off from the power supply mains. With devices with electrical buttons, for turning the power supply mains off, a switch is provided which is actuated manually in addition to the conventional handling of the turntable, and indeed at the beginning and at the end of a playing period. This results necessarily in that a device, if it were to be switched off from the power supply mains by the pick-up could provide no low voltage for the solenoids which are controllable by electrical buttons. The initial readiness circuits which are used with devices with solenoids, which circuits for the duration of a playing period are able to be turned on and manually again turned off at the end, complicate the service operation of the device.

This disadvantage is particularly momentous since the comparatively large extra expense, which is caused by control with solenoids and which should offer comfort in operation, brings about more difficulty in operation. This problem by use of solenoids for alternating voltage of power supply mains would indeed be possible to solve, however it would require a comparatively high expense. The use of conventional self-holding circuits appears not obvious here since the switch which is to be controlled, besides deals with a spring switch which remains in its shifted or regulated position, so that a self-holding circuit must appear contrary to sense. On the other hand also no direct connection between the main switch and the means which controls it is possible, or respectively, the main switch additionally still is mechanically dependent on two other control influences such as the pick-up arm movement or a switching-off device.

It is an object of the invention to provide a switching device which simplifies the operation of the device concerned with here.

It is another object of the present invention to aid the solution of the above-mentioned object with a switch device for a turntable with a starting device which closes the switch (3) for the drive motor on the one hand by means of a swinging movement of the pick-up arm manually during swinging-in from its support rest onto the record and on the other hand by means of a direct current (dc) low voltage solenoid (5) which is actuated by momentary actuation of an operating service element (8), the latter being connected with a first contact pair (6), and a switch-off device (e.g. 10) which acts automatically with the arriving of the pick-up or reproducing head in the run-out groove of the record, the switch-off device opening the switch (3) for the drive motor and containing a switch for the entire current supply of the device from the power supply mains, characterized in the manner that in a per se known manner a common main switch (3) lies in the circuit for the drive motor (2) and the other current supply of the device, and a second contact pair (9) is connected with the operating element for starting the device such that it opens and closes in the same direction with said first contact pair (6) for the solenoid (5) and is connected in parallel to the main switch (3).

A further advantage of the invention is that the second contact pair (9) of the operating service element (8) can be constructed easier than a power mains supply switch for the device, since first of all it is not subjected to that main loading of a switch which results from the opening of the circuit.

Figure 2:
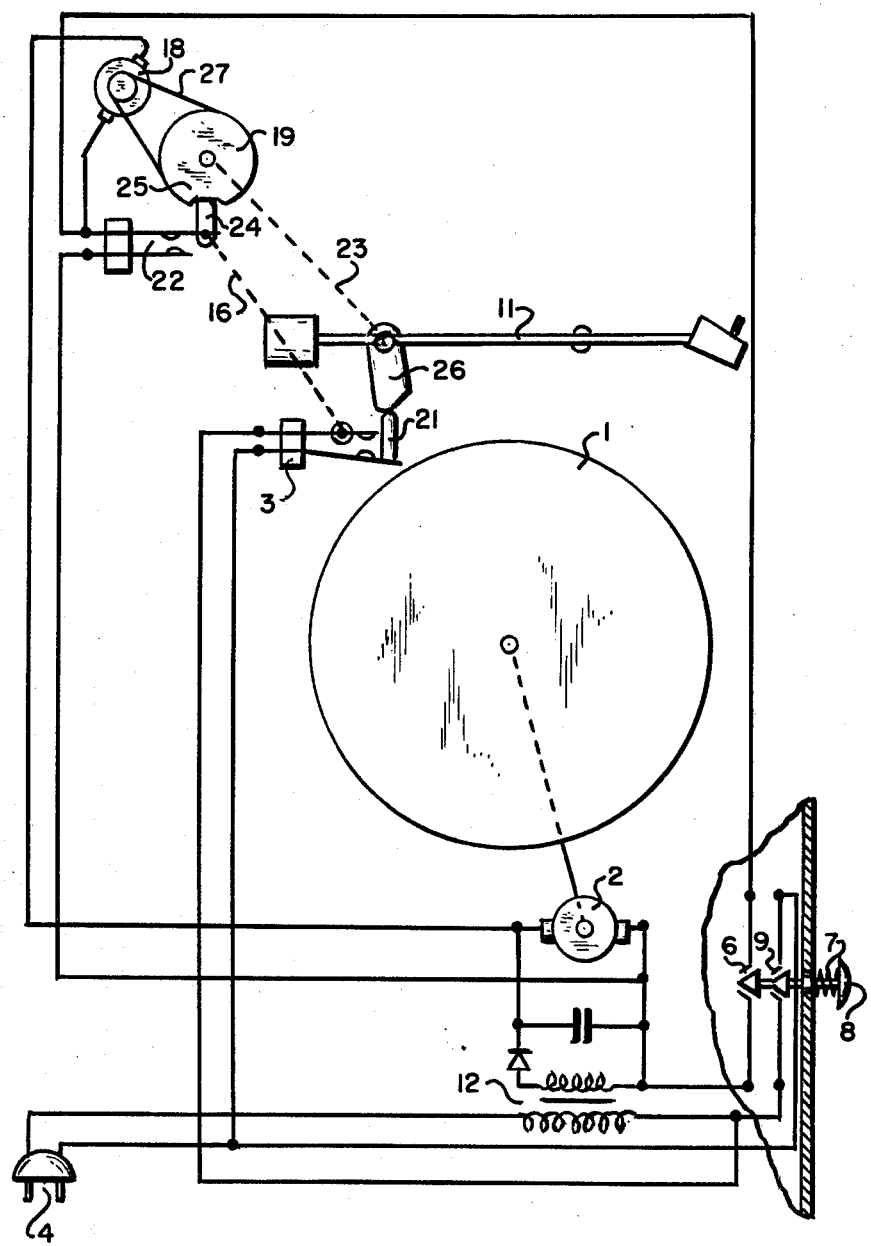

With the above and other objects and advantages in view, the present invention will become more clearly understood in connection with the detailed description of preferred embodiments, when considered with the accompanying drawings, of which:

FIG. 1 is a schematic illustration of the essential parts of one embodiment of a switching device of a turntable in accordance with the invention viewed from below; and FIG. 2 is a schematic illustration of the essential parts of another embodiment of a switching device of a turntable in accordance with the invention using a servomotor in place of the solenoid viewed from above.

Referring now to the drawings, the turntable 1 is driven by means of a motor 2 which motor is connectable to the power supply mains 4 via a main switch 3. Further a current supply part 12 for the other current supply of the device is connectable to the power supply mains via the main switch 3, from which also referring to FIG. 1 a solenoid 5 and referring to FIG. 2 a servomotor 18 is supplied with low voltage—direct voltage (dc) via a solenoid circuit containing a diode and a transformer.

A first contact pair 6 lies in the circuit of the solenoid 5 and the circuit of the servomotor 18 respectively, the first contact pair 6 being connected with an operating service element 8, the latter being actuatable against the force of a spring 7 which biases the push button outwardly. Further a second contact pair 9 is connected with the operating element 8, the second contact pair 9 being connected in parallel to the main switch 3.

Referring to FIG. 1 the armature 13 of the solenoid 5 acts on a movement control mechanism 10 of the device connecting said movement control mechanism 10 in a manner known per se and shown for example in U.S. Pat. No. 3,848,875 via a drive member 14 with the turntable 1. Said movement control mechanism 10 on its part is connected by means of a control member 16 with the main switch 3 and by means of a control lever 15 with the pick-up arm 11. The control movement mechanism 10 in addition to controlling the main switch 3 also controls the automatic movement of the pick-up arm 11.

Referring to FIG. 2 a servomotor 18 via control members 27, 19, 23 operates the automatic movements of the pick-up arm 11 (instead of the movement control mechanism 10 operated by the turntable 1 referring to FIG. 1), which on its part via a control member 16 operates the main switch 3 which is a normally-closed contact. Further with control member 16 a switch 22 for the current circuit of the servomotor 18 is connected.

For starting the device, the operating element 8 is momentarily pressed down, whereby via the contact pair 9 the drive motor 2 and the current supply part 12 are connected to the power supply mains 4; simultaneously also referring to FIG. 1 the solenoid 5 and referring to FIG. 2 the servomotor 18 obtains current from the current supply part 12 via the contact pair 6. Referring to FIG. 1 the armature 13 of solenoid 5 brings the main switch 3 into its closing position via the control movement mechanism 10 and its control member 16, respectively, in which closing position it remains as a result of its formation as a spring switch as illustrated and as a result of the formation of the movement control mechanism, respectively, when the armature 13 returns into its starting position. Referring to FIG. 2 the main switch 3 and with it the switch 22 for the servomotor 18 instead of via the movement control mechanism 10 is kept in closed position by the drive of the servomotor 18 itself after the operating element 8 momentarily has been pressed down, since as soon as the servomotor 18 is started, the control disc 19 which is driven by a belt 27 rotates and by this a cam 24 raises from a recess 25 on the circumference of the disc 19 by which the control member 16 (which is connected with the cam 24) closes switch 22 and main switch 3 and keeps them closed as long as the disc 19 has rotated one revolution and has finished its operating cycle, respectively. On the end of the operating cycle of the disc 19 switch 22 will be opened again by the cam 24 falling into the recess 25 but not the main switch 3, since the pick-up arm 11 in the meantime has swing inwards over the record and by that a cam 26 rotating with the pick-up arm 11 at which an abutment member 21 connected with main switch 3 sliding on the cam 26 is released and by this closing the main switch 3.

Another possibility for starting the device resides in lifting the pick-up arm 11 from its support rest and manually swinging it in over the record, by control means of which referring to FIG. 1 cam 17 (which cam 17 is connected with the pivot axle of the pick-up arm 11) actuates a control lever 15, the latter being connected with the control movement mechanism 10, by which again the control movement mechanism 10 closes the main switch 3 by means of its control member 16 in a manner known per se and shown for example in the U.S. Pat. No. 3,163,428.

Referring to FIG. 2 starting of the apparatus is possible in the same manner by control means of which a cam 26 (which cam 26 is connected with the pivot axle of the pick-up arm 11) actuates an abutment member 21, the latter being connected to the main switch 3 in such manner, that by manually swinging the pick-up arm 11 in the said manner the cam 26 releases the abutment member 21 and by this closing the main switch 3. In both cases for starting the apparatus a bridging or connecting across of the main switch 3 is not necessary immediately on the start of operating momentarily, since the activation of the solenoid 5 and the servomotor 18, respectively, is unecessary so that also no voltage need be made available for it.

Turning off the device from the power supply mains by means of the main switch 3 which does not belong to this invention takes place automatically at the end of the playing of a record by the control movement mechanism 10 by means of its control member 16, the control movement mechanism 10 being driven by means of the turntable 1 via the drive member 14. This operation is brought about or released in a per se known way and shown for example in the U.S. Pat. No. 3,848,875 (not further illustrated) in the manner that a switching mechanism responds to the accelerated horizontal pivoting of the pick-up during the entering of same into the run-out groove (throw-out spiral or concentric groove) of the record.

While I have desclosed two embodiments of the invention it is to be understood that these embodiments are given by example and not in a limiting sense.

I claim:

1. A switch device for a turntable, comprising
   a drive motor,
   a turntable operatively driven by said drive motor,
   a low voltage solenoid having an armature,
   a current supply part being operatively connected to said low voltage solenoid,
   a solenoid circuit in which said solenoid is disposed,
   a main switch being disposed in a common power supply circuit for said drive motor and said current supply part,
   a pick-up arm pivotally mounted to swing in over the turntable,
   movement control means for control of the movement of said pick-up arm, said movement control means including a control member connected with said main switch,
   said control member of said movement control means being controlled by said armature of said low voltage solenoid by means of said movement control means such that said first control member closes said main switch when said solenoid circuit of said low voltage solenoid is closed, at which said main switch is hold in a stable condition,
   control means between the said pick-up arm and the said main switch activatable by the movement of the pick-up arm from its rest position to its scanning position over the said turntable and with it closing the said main switch,
   drive connection means between said turntable and said movement control means for driving the latter for the duration of a working cycle by said turntable at which said control member is activated by said movement control means such that said control member opens said main switch at the end of the working cycle,
   a first contact pair being disposed in said solenoid circuit for said low voltage solenoid,
   a second contact pair being disposed in parallel to said main switch, a spring-biased operating element for starting the device, actuatable against the spring biasing, said first and said second contact pairs being connected with said operating element such that both said contact pairs close when said operating element is pressed down against the spring biasing action.

2. A switch device for a turntable comprising a drive motor, a turntable operatively driven by said drive motor, a low voltage servomotor, a current supply part being operatively connected to said low voltage servomotor, a servomotor circuit in which said servomotor is disposed, a main switch being disposed in a common power supply circuit for said drive motor and said current supply part, a pick-up arm pivotally mounted to swing in over the turntable, movement control means for control of the movement of said pick-up arm, said movement control means drivable by the said servomotor and including a control member connected with said main switch, said control member of said movement control means being controlled by said low voltage servomotor by means of said movement control means such that said control member closes said main switch when said servomotor circuit of said low voltage servomotor is closed, and hold said main switch in a stable condition, control means between the said pick-up arm and the said main switch activatable by movement of the pick-up arm from its rest position to its scanning position over the said turntable and with it closing the said main switch, said servomotor driving said movement control means for control of the movement of said pick-up arm for the duration of a working cycle at which said control member is activated by said movement control means such that said control member opens said main switch at the end of the working cycle, a first contact pair being disposed in said servomotor circuit for said low voltage servomotor, a second contact pair being disposed in parallel to said main switch, a spring-biased operating element for starting the device, actuatable against the spring biasing, said first and said second contact pair being connected with said operating element such that both said contact pairs close when said operating element is pressed down against the spring biasing action.

* * * * *